(12) United States Patent
Whitton et al.

(10) Patent No.: US 8,606,476 B2
(45) Date of Patent: Dec. 10, 2013

(54) CLOSED-LOOP CLUTCH CONTROL USING A FILTERED PISTON POSITION SIGNAL

(75) Inventors: Matthew D. Whitton, Howell, MI (US); Robert L. Williams, Holly, MI (US); Steven P. Moorman, Dexter, MI (US); Cheol W. Kim, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/352,701

(22) Filed: Jan. 18, 2012

(65) Prior Publication Data

US 2013/0184951 A1    Jul. 18, 2013

(51) Int. Cl.
   *F16D 15/00*    (2006.01)
(52) U.S. Cl.
   USPC .................................. 701/67; 701/51; 192/31
(58) Field of Classification Search
   USPC ...................... 192/31, 48.1; 701/51
   See application file for complete search history.

(56) References Cited

U.S. PATENT DOCUMENTS

| 2002/0035009 A1* | 3/2002 | Saito ................................ 477/50 |
| 2009/0211862 A1* | 8/2009 | Moorman et al. ............... 192/40 |
| 2010/0286870 A1* | 11/2010 | Endo et al. ....................... 701/41 |
| 2011/0283830 A1* | 11/2011 | Renard et al. .................... 74/664 |

FOREIGN PATENT DOCUMENTS

EP      2233766 A1 *   9/2010

* cited by examiner

*Primary Examiner* — Mary Cheung
*Assistant Examiner* — Yuen Wong
(74) *Attorney, Agent, or Firm* — Quinn Law Group, PLLC

(57) ABSTRACT

A vehicle includes an engine, transmission, and controller. The transmission includes a clutch pack, a clutch piston, and a position sensor. The sensor measures a changing magnetic field with respect to the piston, and encodes the measured magnetic field as a raw position signal. The controller receives the raw position signal and processes the raw position signal through a signal processing module to generate a filtered signal attenuating signal noise in the position signal. The controller determines a commanded position of the piston, and calculates separate proportional (P), derivative (D), and integral (I) control terms using the commanded position and filtered position signal. The controller also calculates a feed-forward control term using the commanded position, and a required flow rate for actuating the clutch pack as a function of the PID terms and the feed-forward commanded position term. The controller actuates the clutch pack using the commanded flow rate.

15 Claims, 3 Drawing Sheets

CLOSED-LOOP CLUTCH CONTROL USING A FILTERED PISTON POSITION SIGNAL

TECHNICAL FIELD

The present disclosure relates to a system and a method for closed-loop control of a hydraulically-actuated clutch using a filtered clutch piston position signal.

BACKGROUND

Fluid-actuated clutch assemblies are used to transfer torque between different members of a vehicle transmission. In a typical clutch assembly, fluid circulated via a pump moves a clutch piston within a cylinder. Motion of the piston compresses or releases a clutch pack. In some transmission designs such as a dual-clutch transmission having two clutch packs, a concentric slave cylinder assembly may be used to separately compress or release the clutch packs. The linear position of the piston within its cylinder is a value that may be used by a transmission controller in controlling a clutch actuation event.

SUMMARY

A vehicle is disclosed herein that includes an engine, a transmission, and a controller. The transmission includes a clutch having a clutch pack, a piston which compresses and releases the clutch pack to actuate the clutch, and a magnetic position sensor. The magnetic position sensor is positioned with respect to the piston, and measures a changing magnetic field with respect to the piston as the piston moves within its cylinder. The sensor encodes the measured magnetic field as a raw position signal and transmits this signal to the controller. The controller receives and filters the transmitted raw position signal, e.g., through a $3^{rd}$ order elliptical filter, a Butterworth filter, a notch filter, and/or a Chebyshev filter.

The filter, which may be embodied as a calibrated signal filtering module recorded on memory of the controller, attenuates predetermined frequencies of signal noise in the raw position signal. The controller also accommodates for any delay in filtering of the raw position signal using a closed-loop proportional-integral-derivative (PID) control approach, i.e., via application of separate P, I, and D control terms, and a clutch command-based feed forward term. Collectively, the present approach helps to avoid position overshoot of the clutch piston.

A control system is also disclosed for a vehicle having a transmission with the piston noted above. The control system includes a magnetic position sensor positioned with respect to the piston and a controller in communication with the sensor. The controller includes tangible, non-transitory memory on which is recorded the signal filtering module described above. The controller receives and filters the transmitted raw position signal to attenuate predetermined frequencies of signal noise in the raw position signal. The controller also accommodates for any delay in filtering of the raw position signal using the closed-loop PID control approach noted above.

A method is also disclosed herein for controlling a clutch using the control system noted above.

The above features and advantages and other features and advantages of the present invention are readily apparent from the following detailed description of the best modes for carrying out the invention when taken in connection with the accompanying drawings.

DETAILED DESCRIPTION

Figure 1:
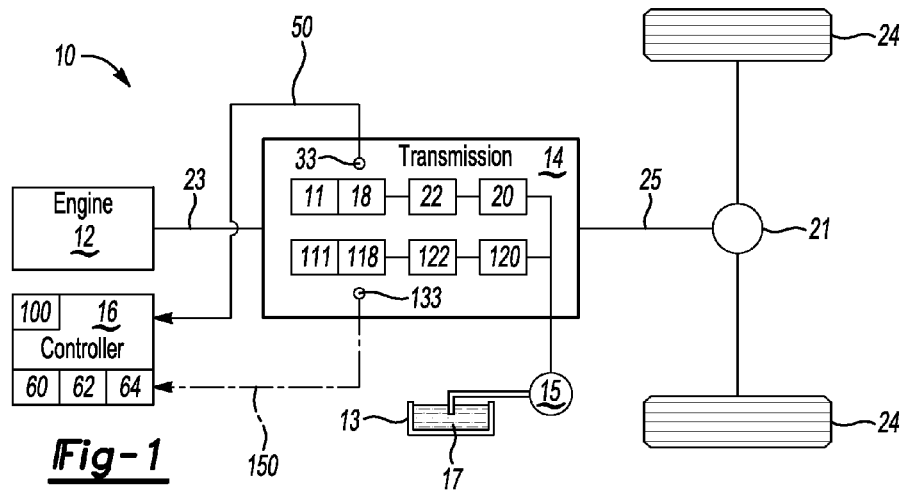
FIG. 1 is a schematic illustration of a vehicle having a fluid-actuated clutch and a controller which fills and actuates the clutch using the present control approach.

Referring to the drawings, wherein like reference numbers correspond to like or similar components throughout the several figures, a vehicle 10 is shown schematically in FIG. 1. The vehicle 10 includes an internal combustion engine 12 having an output member 23 and a transmission 14 having an output member 25. The output member 23 of the engine 12 rotates an input member (not shown) of the transmission 14. The output member 25 of the transmission 14 ultimately delivers output torque to a set of drive wheels 24, for instance via a differential 21 as shown.

The vehicle 10 of FIG. 1 includes a transmission controller 16. The controller 16 includes tangible, non-transitory memory 60 on which is recorded a calibrated data filter in the form of a signal processing module 64, and instructions or computer-executable code for executing the present method 100. An example of the method 100 is described below with reference to FIG. 3. Execution of method 100 ultimately controls the pressurization and fill of one or more hydraulically-actuated or fluidic clutches, with the fill stage fed via a fluid pump 15. The pump 15 circulates oil 17 drawn from a sump 13. The clutches are represented schematically in FIG. 1 as example first and second clutches 11 and 111, respectively. In a particular configuration, the clutches 11 and 111 may be dual input clutches when the transmission 14 is a dual-clutch transmission (DCT).

Figure 2:
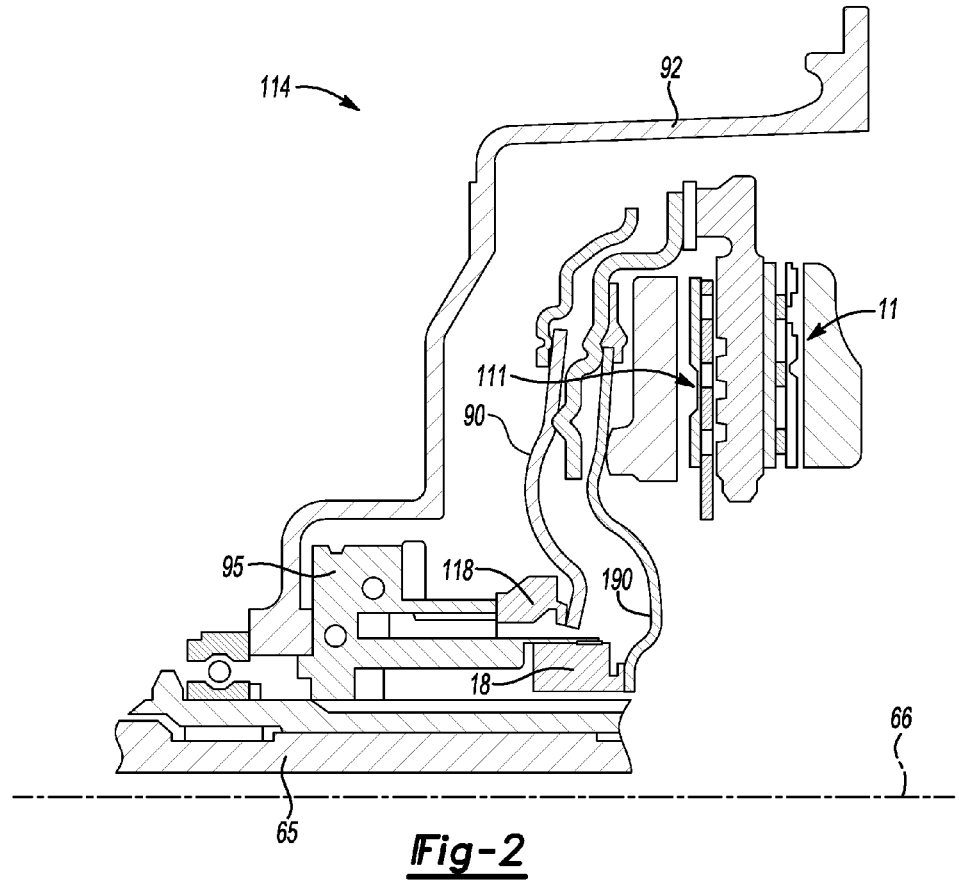
FIG. 2 is a schematic cross-sectional side view illustration of a portion of an example dual-clutch transmission (DCT) that is usable with the vehicle shown in FIG. 1, wherein the example DCT includes a concentric slave cylinder suitable for actuating separate input clutches of the DCT.

Referring briefly to FIG. 2, the transmission 14 of FIG. 1 is shown as an optional DCT 114. As is well understood in the art, a DCT is an automated transmission having a gearbox with two independently-operated and piston-actuated clutches, i.e., clutches 11 and 111. Oil 17 fed through via solenoids 20, 22 and 120, 122, respectively, moves respective pistons 18 and 118.

In a DCT arrangement as shown in FIG. 2, a concentric slave cylinder (CSC) assembly 95 may be positioned radially-outward of a transmission input member 65 having an axis of rotation 66. The CSC assembly 95 may be bolted within a transmission housing 92. The pistons 18, 118 apply force to a respective diaphragm spring 90, 190. The springs 90, 190 ultimately actuate a respective one of the clutches 11, 111 to select between oddly-numbered and evenly-numbered gears.

In a typical DCT, one clutch, e.g., the clutch 11 shown in FIG. 2, selects and controls oddly-numbered gears, for instance first, third, fifth, and reverse gear, while another clutch, for instance the clutch 111, selects and controls the evenly-numbered gears, e.g., second, fourth, and sixth gear. Using a concentric inner-outer clutch arrangement of the type provided by the CSC assembly 95, the gears of a DCT can be shifted without totally interrupting power flow from the engine 12 of FIG. 1. Use of the CSC assembly 95 in the DCT 114 can enable the inner and outer clutches, e.g., clutches 11 and 111, to receive fluid pressure. Other applications such as brakes may also use a CSC. As will be explained below, the present approach may be used to control any transmission using at least one clutch, e.g., clutch 11 of FIG. 1.

Referring again to FIG. 1, the controller 16 may be configured as a microprocessor-based device having such common elements as a microprocessor/CPU 62 and the memory 60 noted above. Memory 60 may include read only memory (ROM), random access memory (RAM), electrically-erasable programmable read-only memory (EEPROM), etc., and any required circuitry including but not limited to a high-speed clock, analog-to-digital (A/D) circuitry, digital-to-analog (D/A) circuitry, a digital signal processor (DSP), and all necessary input/output (I/O) devices and other signal conditioning and/or buffer circuitry. The controller 16 uses a calibrated data filter in the form of a signal filtering module 64 to filter any received raw position signals (arrows 50, 150) from magnetic position sensors 33 and 133, respectively, with a corresponding one of the sensors 33, 133 used per piston 18, 118. In other words, if just one piston 18 is used, the sensor 133 may be omitted.

The raw position signals (arrows 50, 150) may be collected and determined using the respective magnetic position sensors 33, 133. The sensors 33, 133 are positioned with respect to the pistons 18, 118. As is well understood in the art, magnetic linear position sensing may include the positioning of a cylindrical permanent magnet on a surface of or embedded within the structure of a given piston, e.g., the piston 18 and/or 118. The sensors 33, 133 may be magneto-inductive magnetic field sensors, Hall-effect sensors, or the like, and may include a sensing portion such as coils or windings and a passive portion such as a cylindrical permanent magnet.

The sensing portion of the sensors 33, 133 may be connected to a stationary portion of the transmission 14 so as to fully circumscribe the permanent magnet(s) located within a piston whose position is being measured, e.g., pistons 18 and/or 118. The magnetic field with respect to the moving piston 18, 118 changes due to the translation of the piston 18, 118 within its mating cylinder or other enclosure. This changing magnetic field is relayed as the raw position signals (arrows 50,150) to the controller 16, which calculates the linear position of the piston 18, 118 by processing the raw/unfiltered position signals (arrows 50, 150). Magnetic position sensors such as the sensors 33, 133 shown in FIG. 1 are typically seen in conjunction with CSC designs such as the example shown in FIG. 2. However, such sensors 33, 133 may also be used to determine the linear position of any moveable object, and therefore the present approach is not limited to DCTs or CSCs.

Figure 3:
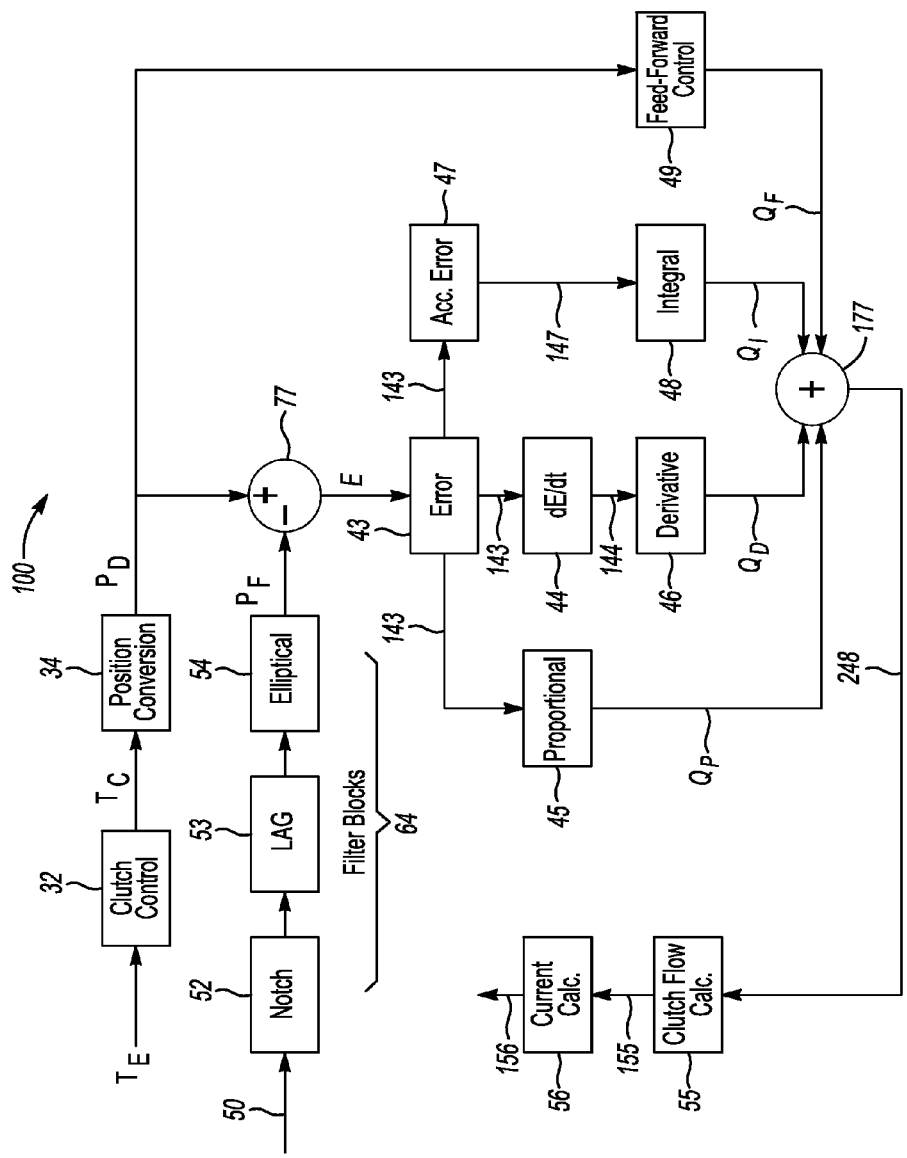
FIG. 3 is a schematic block flow diagram of an example logic configuration for the controller shown in FIG. 1.

Referring to FIG. 3, a flow diagram 100 describes an example general logic flow or method occurring within the controller 16 of FIG. 1. A clutch control command block 32 receives an engine torque signal (arrow $T_E$). The clutch control command block 32 calculates a clutch torque command (arrow $T_C$) for a designated clutch, e.g., the clutch 11 shown in FIG. 1.

A position conversion block 34 translates the commanded torque (arrow $T_C$) from the clutch control command block 32 to a commanded/desired clutch position (arrow $P_D$). The commanded/desired clutch position (arrow $P_D$) is fed into a summation node 77 and a feed-forward flow control block 49 as described below. The summation node 77 also receives a filtered position signal (arrow $P_F$) from a signal processing module (SPM) 64.

It is recognized herein that magnetic sensors such as the sensors 33, 133 of FIG. 1 may be subject to signal noise when used in conjunction with a highly complex system of rotating components, such as within the transmission 14 of FIG. 1. That is, rotating components can change or interfere with the magnetic fields being measured by the sensors 33, 133. Likewise, electrical current flowing through any electrical component, such as the windings of solenoids 22, 122 shown in FIG. 1, may alter a proximate magnetic field. Thus, filtering techniques are applied to the received raw position signals (arrow 50) from the magnetic position sensors 33, 133 shown in FIG. 1.

In a non-limiting embodiment, the SPM 64 may apply a $3^{rd}$ order elliptical/Cauer filter for the low-pass filtering of noise on the received raw position signals (arrow 50). Other suitable approaches may exist depending on the embodiment of the transmission 14 of FIG. 1, e.g., a $1^{st}$ order Butterworth filter having a relatively flat frequency response in the pass band, a Chebyshev filter having a steeper rolloff and increased pass band ripple (type I Chebyshev) or stop band ripple (type II Chebyshev), a lag filter, etc.

Figure 4:
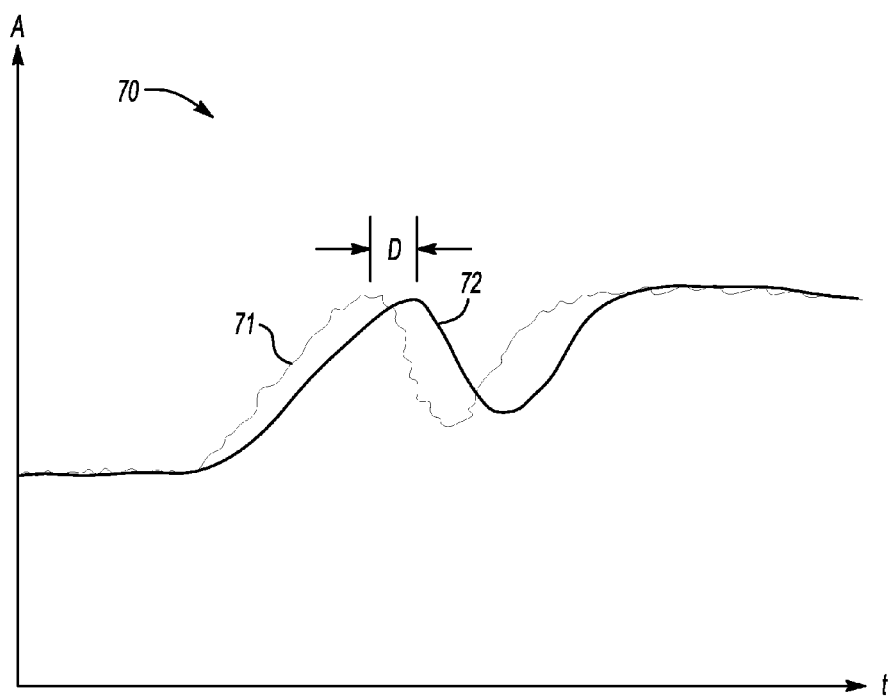
FIG. 4 is a time plot of an example raw/unfiltered position signal and a filtered position signal.

Referring briefly to FIG. 4, an example time plot 70 illustrates changing signal amplitude (A) versus time (t). A filtered signal (trace 72), i.e., the filtered position signal (arrow $P_F$) of FIG. 3, has a delay (D) relative to the unfiltered/raw signal (trace 71) received by the SPM 64 of FIG. 3. Different signal filtering approaches can be used to produce a desired delay and filtering response, and therefore the example of FIG. 4 is illustrative and non-limiting. The present approach processes the output of the signal SPM 64 in such a manner as to compensate for the delay (D) during the actuation of a given clutch.

Typical clutch position control using a closed-loop feedback control approach tends to be slow. As is understood in the art, closed-loop feedback control logic must wait for sufficient error to develop before taking corrective action. Use of a proportional-derivative (PD) control lookup table indexed by accumulated error and error rate may be used in one embodiment for simplicity, but this approach may be difficult to properly calibrate. Straightforward proportional-integral-derivative (PID) control can be more robust than PD control, but like open-loop controls such an approach can be relatively slow. The approach of FIG. 3 is therefore intended to improve the response speed of typical PID control with a feed-forward approach, in conjunction with signal noise filtering via the SPM 64 on any received raw position signal (arrow 50).

Referring again to FIG. 3, the present method 100 may use PID control in conjunction with position signal filtering and command-based feed forward control. Feed-forward control is used to predict the amount of required flow to the clutch 11 of FIG. 1 without waiting for error to develop. Other embodiments may be used in which a lookup table is indexed by error and error rate, e.g., a PI approach in tabular form, to rely primarily on feedback control.

The PID approach of FIG. 3 can be used to optimize results in part by applying calibrated temperature-based gain values for proper error correction. The SPM 64 is thus calibrated to attenuate particular noise frequencies and, from the filtered signal, to generate an accurate flow command that fully accounts for the filtering delay. The SPM 64 may be embodied as one or multiple filter blocks 52, 53, and/or 54. In a particular embodiment, filter block 52 may be a notch filter, filter block 53 may be a lag filter, and filter block 54 may be a $3^{rd}$ order elliptical filter. Each filter block 52, 53, 54 filters the received raw position signal (arrow 50) in a different manner. The filtered position signal (arrow $P_F$) is then passed to the summation node 77 along with the desired position (arrow $P_D$) as noted above. An error signal (arrow E) is then calculated at the summation node and its value is recorded in an error block 43 as the instantaneous error (arrows 143).

Next, the instantaneous error (arrows 143) passes directly to a proportional control (P) block 45. The instantaneous error (arrows 143) also passes indirectly to a derivative control (D) block 46 via an error rate calculation block 44 and to an integral control (I) block 48 via an accumulated error block 47. The error rate calculation block 44 calculates the change in the instantaneous error over time, i.e., dE/dt, and transmits a instantaneous error rate signal (arrow 144) to D block 46. The accumulated error block 47 tracks the accumulated error, which is the sum of the +/− instantaneous position errors over time, and transmits an accumulated error signal (arrow 147) to I block 48.

P block 45 calculates the proportion (P) term of the particular flow rate ($Q_P$) needed to fill the designated clutch, i.e., $Q_P = K_P \cdot Error$, with "Error" being the instantaneous error coming from block 43 and $K_P$ being a calibrated proportional constant. The value $Q_P$ is then fed to summation block 177. Likewise, D block 46 calculates the derivate (D) term of the flow rate ($Q_D$) needed to fill the designated clutch, i.e., $Q_D = K_D \cdot ErrorRate$, with "Error Rate" being the calculated rate at block 44 in a prior step and $K_D$ being a calibrated derivative constant. In the same manner, integral control block 48 calculates the integral (I) term of the flow rate ($Q_I$) needed to fill the designated clutch, i.e., $Q_I = K_I \cdot \Sigma Error$, with "ΣError" being the accumulated error from block 47.

The outputs of blocks 45, 46, and 48 are fed to summation node 177 where they are added to an output of control block 49. The feed-forward control block 49 calculates a feed-forward control term as a function of the position command (arrow $P_D$) from block 34, i.e., $Q_F = K_{FFWD} \cdot A_{PISTON} \cdot \Delta x / \Delta t$, wherein $A_{PISTON}$ is the surface area of the actuating/displacing face of the piston 18 and Δx is ($P_D - P_{DL}$), with $P_{DL}$ being the position command/commanded position in the immediately prior control loop.

The output (arrow 248) of the summation node 177 is then fed in another step into a commanded clutch flow calculation block 55. The output goes to a current calculation block 56, which converts the commanded clutch flow into an electrical current command (arrow 156) for driving the solenoid 22 of FIG. 1.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an engine;
a transmission operatively connected to the engine, and having:
 a clutch having a clutch pack;
 a piston which is movable via pressurized fluid to apply a force to actuate the clutch pack; and
 a clutch position sensor positioned with respect to the clutch piston, wherein the clutch position sensor measures a changing magnetic field with respect to the clutch piston as the clutch piston moves with respect to the clutch pack, and then encodes the measured magnetic field as a raw position signal of the piston; and
a controller which controls actuation of the clutch using a filtered position signal;
wherein the controller includes a microprocessor and tangible, non-transitory memory on which is recorded computer-executable code, wherein the controller is in communication with the clutch position sensor, and is configured to execute the code to thereby:
 receive the raw position signal from the clutch position sensor and generate the filtered position signal to thereby attenuate signal noise in the raw position signal;
 determine a commanded position signal of the piston;
 calculate an instantaneous error value between the filtered position signal and the commanded position signal;
 calculate separate proportional (P), integral (I), and derivative (D) clutch flow control terms using the instantaneous error value;
 calculate a feed-forward clutch flow control term as a function of the commanded position;
 calculate a required flow rate for actuating the clutch pack as a function of the PID clutch flow control terms and the feed-forward clutch flow control term; and
 control an actuation of the clutch pack using the required flow rate.

2. The vehicle of claim 1, wherein:
the transmission is a dual-clutch transmission (DCT) having a concentric slave cylinder (CSC);
the piston includes a first and a second piston; and
the CSC separately controls motion of the first and the second piston.

3. The vehicle of claim 1, wherein the controller filters the raw position signal through a $3^{rd}$ order elliptic filter.

4. The vehicle of claim 3, wherein the controller further filters the raw position signal through at least one of a lag filter, a $1^{st}$ order Butterworth filter, and a Chebyshev filter.

5. The vehicle of claim 1, wherein the controller includes a pressure conversion block which translates a commanded clutch torque into the commanded position.

6. A control system for a vehicle having a transmission including a clutch having a clutch pack and a piston that moves via pressurized fluid to thereby actuate the clutch pack, the control system comprising:
a clutch position sensor positioned with respect to the piston, wherein the clutch position sensor measures a changing magnetic field with respect to the piston as the piston moves, and encodes the measured magnetic field as a raw position signal; and
a controller in communication with the clutch position sensor, and having a processor and tangible, non-transitory memory on which is recorded instructions for filtering the raw position signal and controlling actuation of the clutch using a filtered position signal;
wherein the controller includes a processor which receives and processes the raw position signal from the sensor through a signal processing module thereby generate the filtered position signal and thereby attenuate signal noise in the raw position signal, and wherein the controller is configured to:
 determine a commanded position signal of the piston;
 calculate an instantaneous error value between the filtered position signal and the commanded position signal;
 calculate separate proportional (P), integral (I), and derivative (D) clutch flow control terms using instantaneous error value;
 calculate a feed-forward clutch flow control term as a function of the commanded position;
 calculate a required flow rate for actuating the clutch as a function of the PID clutch flow control terms and the feed-forward clutch flow control term; and control the actuation of the clutch pack using the required flow rate.

7. The system of claim 6, wherein the transmission is a dual-clutch transmission (DCT) and the clutch position sensor includes a pair of clutch position sensors, and wherein the controller receives a pair of the raw position signals from the pair of clutch position sensors and processes the raw position signals through the signal processing module to generate a pair of filtered position signals, each of which attenuates the signal noise in the raw position signals.

8. The system of claim 7, wherein the signal processing module includes a $3^{rd}$ order elliptic filter.

9. The system of claim 6, wherein the signal processing module further includes at least one of a lag filter, a $1^{st}$ order Butterworth filter, and a Chebyshev filter.

10. The system of claim 6, wherein the controller includes a pressure conversion block which translates a commanded torque into the commanded position signal.

11. A method for controlling a clutch in a vehicle, wherein the clutch includes a moveable clutch piston, the method comprising:
  receiving a raw position signal from a magnetic position sensor positioned with respect to the clutch piston;
  processing the raw position signal through a signal processing module of a controller to generate a filtered position signal which attenuates noise in the raw position signal;
  determining a commanded position signal of the clutch piston;
  calculating an instantaneous error value between the filtered position signal and the commanded position signal;
  calculating separate proportional (P), integral (I), and derivative (D) clutch flow control terms via the controller using the calculated instantaneous error value;
  calculating a feed-forward clutch flow control term as a function of the commanded position signal;
  calculating a required flow rate for actuating the clutch pack as a function of the PID clutch flow control terms and the feed-forward clutch flow control term; and
  controlling actuation of the clutch using the required flow rate.

12. The method of claim 11, wherein the transmission is a dual-clutch transmission.

13. The method of claim 11, wherein processing the raw position signal through a signal processing module includes processing the raw position signal through a $3^{rd}$ order elliptic filter.

14. The method of claim 13, wherein processing the raw position signal through a signal processing module further includes processing the raw position signal through at least one of a lag filter, a $1^{st}$ order Butterworth filter, and a Chebyshev filter.

15. The method of claim 11, further comprising translating a commanded torque into the commanded position via the controller.

* * * * *